United States Patent
Ent et al.

(10) Patent No.: US 10,403,236 B2
(45) Date of Patent: Sep. 3, 2019

(54) ELECTRONIC DEVICE WITH FOLDED DISPLAY AND METHOD FOR PRESENTING CONTENT

(71) Applicant: Lenovo (Singapore) Pte. Ltd., New Tech Park (SG)

(72) Inventors: Ali Kathryn Ent, Raleigh, NC (US); Roland Kamakau Albion Alo, Jr., Raleigh, NC (US); Cuong Huy Truong, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 195 days.

(21) Appl. No.: 15/343,655

(22) Filed: Nov. 4, 2016

(65) Prior Publication Data

US 2018/0130447 A1 May 10, 2018

(51) Int. Cl.
| | |
|---|---|
| *G06F 3/041* | (2006.01) |
| *G09G 5/14* | (2006.01) |
| *G06F 1/16* | (2006.01) |
| *G06F 3/0481* | (2013.01) |
| *G06F 3/14* | (2006.01) |
| *G06F 3/147* | (2006.01) |

(52) U.S. Cl.
CPC ............ *G09G 5/14* (2013.01); *G06F 1/1641* (2013.01); *G06F 1/1643* (2013.01); *G06F 1/1647* (2013.01); *G06F 1/1652* (2013.01); *G06F 3/0481* (2013.01); *G06F 3/147* (2013.01); *G06F 3/1423* (2013.01); *G09G 2300/023* (2013.01); *G09G 2380/02* (2013.01)

(58) Field of Classification Search
CPC ........... G09G 5/14; G06F 3/044; G06F 3/048; G06F 3/0481
See application file for complete search history.

(56) References Cited

U.S. PATENT DOCUMENTS

| | | | | |
|---|---|---|---|---|
| 7,821,780 | B2* | 10/2010 | Choy | G06F 1/1616 361/679.06 |
| 8,203,832 | B2* | 6/2012 | Szabolcsi | G06F 1/1616 248/917 |
| 9,367,280 | B2* | 6/2016 | Avrahami | G06F 3/1446 |
| 9,791,943 | B2* | 10/2017 | Hulford | G06F 3/14 |

OTHER PUBLICATIONS

Bihlmayr et al.; OLED Display Driver for the HCS08 Family; Freescale Semiconductor, Inc; 2007; 42 pages.

* cited by examiner

*Primary Examiner* — Vijay Shankar
(74) *Attorney, Agent, or Firm* — Dean D. Small; The Small Patent Law Group, LLC

(57) ABSTRACT

A computer implemented method, device and computer program product are provided that includes a display unit having front and back surfaces. The display unit comprises a flexible display layer having primary and secondary viewing regions formed as a monolithic structure. The primary viewing region is mounted on the front surface of the display unit. The secondary viewing region is folded about at least an edge of the display unit. The electronic device comprises a memory to store program instructions and a processor to execute the program instructions to direct the primary and secondary viewing regions to display first and second content, respectively.

20 Claims, 7 Drawing Sheets

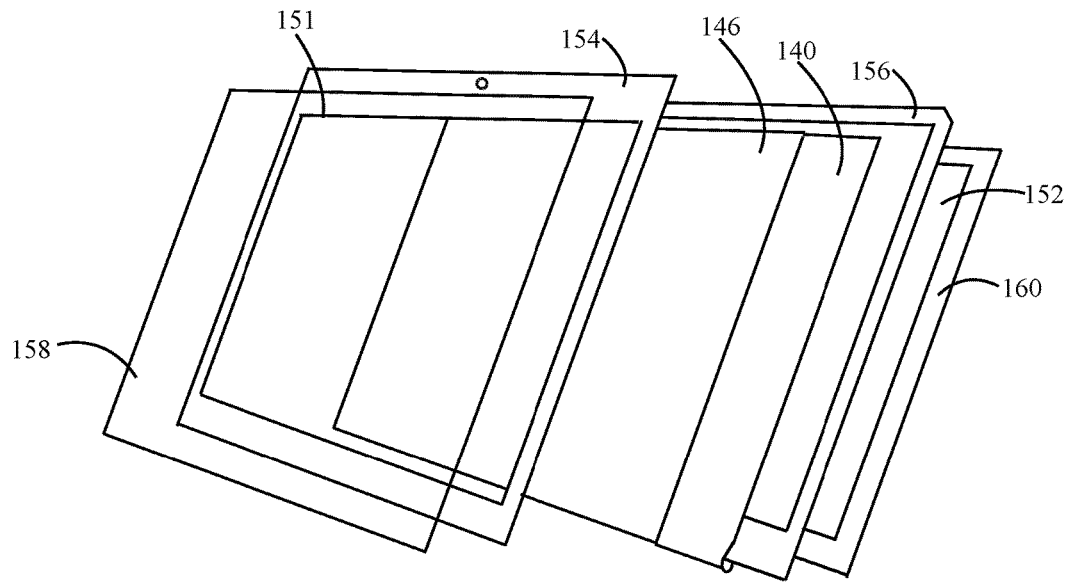
FIG. 2
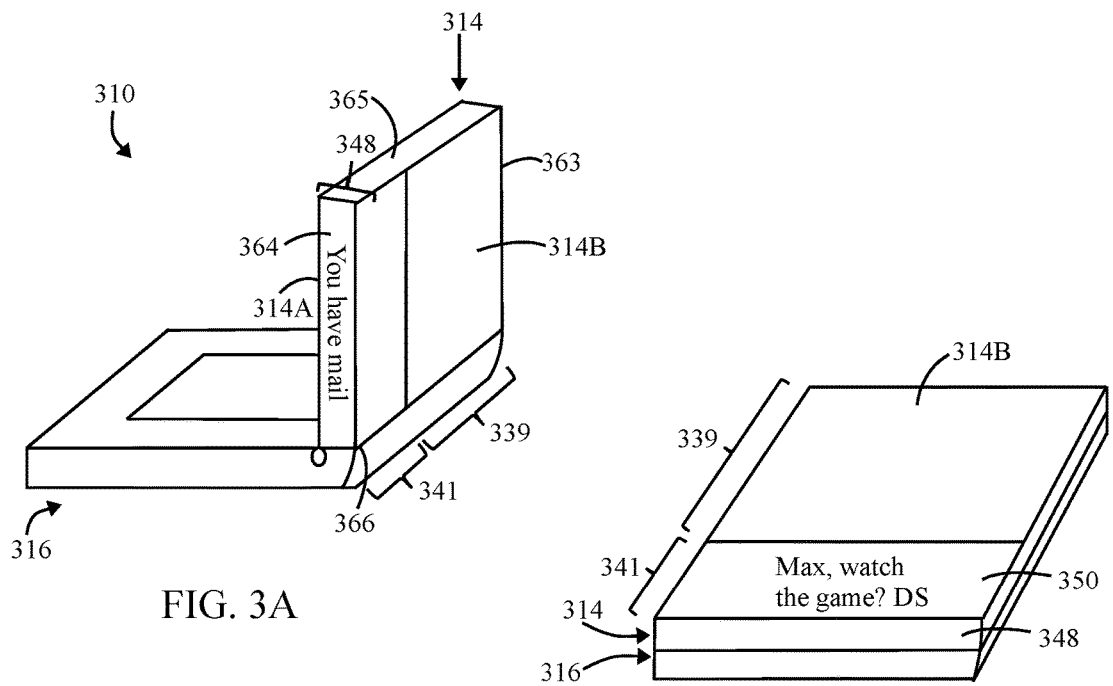
FIG. 3A
FIG. 3B

ELECTRONIC DEVICE WITH FOLDED DISPLAY AND METHOD FOR PRESENTING CONTENT

FIELD

The present disclosure relates generally to electronic devices that include a flexible display folded about an edge of a display unit, and methods for managing presentation of content on different viewing regions of the display.

BACKGROUND OF THE INVENTION

Personal computers (PCs) and tablet devices have become fundamental tools both in personal life and business. The PC and tablet device are easy to operate and simple to carry. However, the PC and tablet device offer slightly different user experiences, which has led individuals to continue using both types of devices for different aspects of personal and business use. For example, the PC offers a larger user interface with a separate keyboard and display that facilitate extended, continuous use, while the tablet device offers a simpler user interface through a touchscreen. However, when the display on a conventional PC is closed, the device shuts down or enters a sleep mode. When shutdown or in the sleep mode, the PC is inoperative and is unable to provide the user with new incoming information, such as notifications and the like.

On tablet devices, the touchscreen is easy to use while traveling and/or in public areas that do not afford a table or desk to hold a PC. Also, tablet devices facilitate joint viewing of a common display by a primary user and others (e.g. a customer, student, co-worker, family member, etc.). However, conventional tablet devices do not provide the same user interface experience as a conventional PC. Also, a touchscreen utilizes the touchscreen as the only display available and thus the touch sensitive display may become cluttered with fingerprints, rendering it more difficult to display content in certain lighting.

Convertible tablet personal computers (convertible PCs) have been proposed that offer the dual functionality of a PC and a tablet device. The convertible PC includes a display portion that is capable of rotating 360 degrees and folding back over the keyboard. However, convertible PCs also experience certain limitations. The convertible PC can be used in two ways, as a normal laptop personal computer (laptop PC) and a tablet PC. When such a convertible PC is changed to a tablet PC, the upward-facing keyboard in laptop PC mode becomes the downward-facing portion in tablet PC mode. Therefore, when the tablet PC is placed on a desk or other similar surface, the keyboard and click pad come into direct contact with the hard surface of the desk. Consequently, this decreases the stability of the device and also increases the likelihood of scratching or damaging the keyboard and click pad.

Further, convertible tablet personal computers require the user to rotate, slide, flip or otherwise turn the display between two different operative positions when switching between a conventional PC mode and a tablet mode. Complex interconnection assemblies are utilized to enable the display to rotate, slide, flip or otherwise turn. The complex interconnection assembly increases the potential for mechanical and/or electrical failures over an extended period of time.

A need remains for improved methods and devices that overcome the disadvantages discussed above and other disadvantages in conventional systems that will become apparent herein.

SUMMARY

In accordance with embodiments herein, an electronic device is provided. The electronic device includes a display unit having front and back surfaces. The display unit comprises a flexible display layer having primary and secondary viewing regions formed as a monolithic structure. The primary viewing region is mounted on the front surface of the display unit. The secondary viewing region is folded about at least an edge of the display unit, The electronic device comprises a memory to store program instructions and a processor to execute the program instructions to direct the primary and secondary viewing regions to display different first and second content, respectively.

Optionally, a core layer may be included having first and second sides. The secondary viewing region may comprise an edge viewing region and a rear viewing region. The edge viewing region may be wrapped about an edge of the core layer. The rear viewing region may be mounted to and may extend at least partially along a second side of the core layer. The flexible display layer may be elongated and may include a continuous homogeneous two dimensional (2D) rectilinear array of digital pixels arranged in rows and columns that traverse the primary and secondary viewing regions between opposite edges of the flexible display layer. The device may further comprise a display driver connected to the array of digital pixels, where the driver writes the first and second content to the primary and secondary viewing regions under direction of the processor.

Optionally, the device may further comprise a main body unit including a keyboard. The display unit may be mounted to the main body unit through a hinge to permit the display unit and main body unit to rotate between open and closed positions. The secondary viewing region may continue to display the second content while the front surface of the display unit is in the closed position and located proximate to the keyboard. A touch sensitive layer may be located over the secondary viewing region of the display layer on the back surface of the display unit. The processor switches to a tablet mode when the display unit is in the closed position and utilizes the back surface of the display unit as a graphical user interface. Optionally, the primary viewing region may not include a touch sensitive layer, thereby avoiding excessive fingerprints being created on the primary viewing region.

Optionally, the processor may utilize the secondary viewing region of the display layer to display one or more of alert content, calendar content, message content, advertisement content, or personalized content. The secondary viewing region of the display layer may cover a limited segment of the back surface of the display unit with a remaining segment of the back surface uncovered by the display layer. The device may further comprise first and second interior lens located over the primary and secondary viewing regions, respectively, of the flexible display layer. First and second exterior protective lens may be located over the first and second interior lens, respectively. A touch sensitive layer may be located over at least one of the first or secondary viewing regions of the flexible display layer. Optionally, the first/primary viewing region may not include a touch sensitive layer, thereby avoiding excessive fingerprints being created on the primary viewing region. The touch sensitive layer may provide inputs to the processor.

In accordance with embodiments herein, a method is provided. The method provides an electronic device comprising a display unit comprising a flexible display layer having primary and secondary viewing regions formed as a monolithic structure. The primary viewing region is located on a front side of a display unit. The secondary viewing region is folded about at least an edge of the display unit. Under control of one or more processors configured with specific executable program instructions, displaying different first and second content on the primary and secondary viewing regions, respectively.

Optionally, the second content may represent notification related content. The displaying may comprise displaying the notification related content in the secondary viewing region. The method may display the second content on the secondary viewing region while the main viewing region is inactive. The electronic device may include a main body unit attached to the display unit through a hinge. The second content may be displayed while the display unit is rotated to a closed position against the main body unit. The method may further identify a mode of operation for the electronic device. The mapping may include mapping sections of the display memory to the primary and secondary viewing regions based on the mode of operation. The method may further comprise mapping sections of a display memory to the primary and secondary viewing regions, and writing the different first and second content to corresponding sections of the display memory in connection with displaying the first and second content on the primary and secondary viewing regions.

In accordance with embodiments herein, a computer program product is provided. The computer program product includes a non-signal computer readable storage medium comprising computer executable code to map a first section of a display memory to a primary viewing region of a flexible display layer having a primary viewing region, and to map a second section of the display memory to a secondary viewing region folded about at least an edge of the display unit. The executable codes to write first and second content to corresponding first and second sections of the display memory in connection with displaying the first and second content on the primary and secondary viewing regions.

Optionally, the executable code may further comprise receiving a notification, and writing notification related content to the corresponding section of the display memory mapped to the secondary viewing region. The executable code may further comprise activating a touch sensitive layer provided within the display unit overlapping the second viewing region when in a first mode of operation and deactivating the touch sensitive layer when in a second mode of operation. By way of example, the first mode may represent one of an initial mode, a standard mode, a presentation mode, a tablet mode, a notifications mode and/or a user query mode, while the second mode represents a different one of the initial mode, standard mode, presentation mode, tablet mode, notifications mode and/or user query mode.

BRIEF DESCRIPTION OF THE DRAWINGS

FIG. 2 illustrates an exploded view of the display unit formed in accordance with an embodiment herein.

FIG. 3A illustrates a rear perspective view of a device having a display unit and a main body unit in accordance with embodiments herein.

FIG. 3B illustrates a side perspective view of the device of FIG. 3A with the display unit and main body unit in accordance with embodiments herein.

DETAILED DESCRIPTION

Figure 1A:
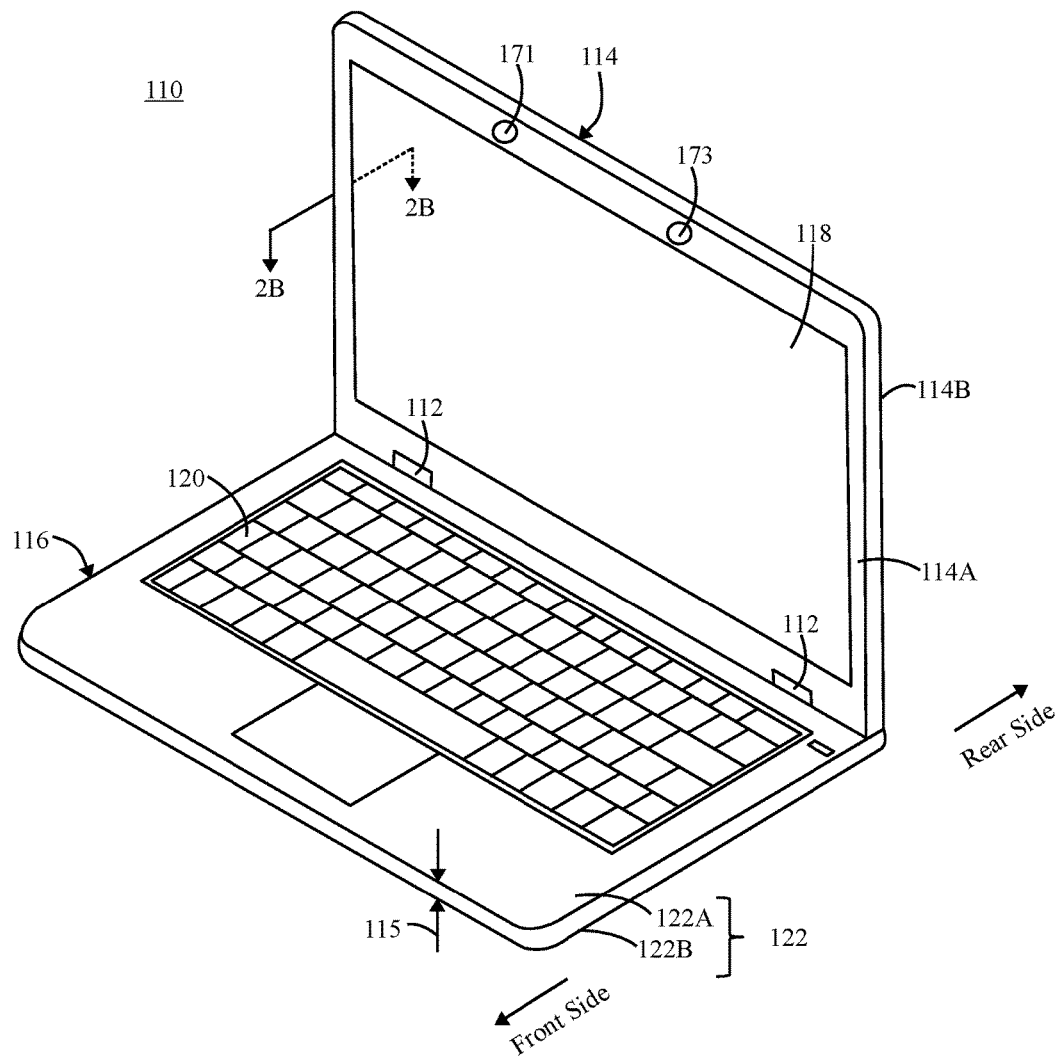
FIG. 1A is a perspective view of an electronic device formed according to one embodiment herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

In accordance with embodiments herein, methods and devices are provided that utilize a flexible display having primary and secondary viewing areas. The primary viewing area is located on a front side of a display unit, while the secondary viewing area wraps about at least an edge of the display unit. The secondary viewing area may be limited to an edge of the display, thereby representing an edge viewing area. The edge viewing area is provided along one or more edges of the display. The secondary viewing area may extend to include a rear viewing region that extends along a rear side of the display unit.

The edge viewing area may remain active to display various types of content when the primary viewing area is closed or otherwise inactive. The edge viewing area may also remain active, to display content, even when the secondary viewing area is inactive. As one example, the secondary viewing area (e.g., edge or rear viewing area) may be managed to display one or more of alert content, calendar content, message content, advertisement content, or personalized content. As a further example, the rear viewing area may be operated in a tablet mode with a touch sensitive user interface. The secondary (edge and/or rear viewing areas) viewing area may remain active while the primary viewing area is active. For example, the secondary viewing area may be managed to display the same content as the primary viewing area (e.g. to enable the user and third parties to view content at the same time without viewing the same screen).

Optionally, the display layer is positioned to cover only a portion of the back surface of the display unit. For example, the secondary viewing region of the display layer may cover a limited segment of the back surface of the display unit with a remaining segment of the back surface uncovered by the display layer.

The terms "content", "display content" and "visual content," as used throughout, shall generally refer to any and all textual, graphical, image or video information or data that may be presented on a display of an electronic device. The content may represent various types of incoming and outgoing textual, graphical, image and video content including, but not limited to, calendar events, email, text messages, alerts, still images, video, advertisements, company information (e.g., company logo, advertisements), screen saver, personalized visual information and the like.

The term "flexible display layer" represents a monolithic structure that comprises one or more organic layers arranged between an array of electrodes. The term "flexible display layer" does not include liquid crystal displays (LCDs). Instead, the flexible display layer may comprise one or more organic light emitting diode layers that are deposited on one another, and electrodes are provided on opposite sides thereof, to create the monolithic structure. The electrodes are arranged with cathodes and anodes on opposite sides of the monolithic structure. The cathodes may be reflective (e.g. as in an OLED) or transparent (as in a transparent OLED).

FIG. 1A is a perspective view of an electronic device 110 formed according to one embodiment herein, showing a state where a display unit 114 is opened from a main body unit 116 by means of hinge 112 so that both will be essentially perpendicular to each other. The display unit 114 is attached to the main body unit 116 so as to be freely opened and closed. The electronic device 110 can be suitably used as a laptop PC when the display unit 114 is angled relative to the main body unit 116. Note that, in addition to such a convertible PC, the embodiments herein can be suitably applied to electronic devices such as cellular phones, a smart phones, and various electronic organizers.

For descriptive convenience, it is assumed that the display unit 114 is completely closed to the main body unit 116 at a 0-degree angle position between the main body unit 116 and the display unit 114 by means of hinge 112, where the display 118 and the keyboard 120 face each other. In relation to a user who looks directly at the front face of the display unit 114, the side closest to the user is called the front side 114A (forward) and side furthest away from the user is called the rear side 114B (rearward). The thickness 115 of the main body unit 116 will be referred to as the vertical direction and the width will be referred to as the lateral direction.

The display unit 114 contains the display 118 and the main body unit 116 contains the keyboard 120. The display unit 114 and the main body unit 116 are constantly connected and rotated, from the 0-degree position to any other angular position, by the hinge 112. The display unit 114 is electrically connected to the main body unit 116 by a cable, not shown, through the hinge 112. The display 118 represents a flexible display layer such as an organic light-emitting diodes (OLED) display. The main body unit 116 is configured such that the hinge 112 is located at the rear edge portion of the main body housing 122. The main body housing 122 is formed into the shape of a flat box and contains various electronic components, not shown, such as a substrate, an arithmetic unit, a processor and a memory that are housed therein. The main body housing 122 includes upper and lower covers 122 and 125. The display unit 114 also includes one or more microphones 171 and one or more cameras 173. The microphone 171 and camera 171 are directed outward to face in a direction toward the keyboard to provide a field of view and audio field directed outward from the front side 114A.

FIG. 2 illustrates an exploded view of the display unit 114 formed in accordance with an embodiment herein. In FIG. 2, the display unit 114 comprises a core layer 140 that is located centrally within the display unit 114. A flexible display layer 146 is mounted on the core layer 140 and wrapped about the opposed first and second sides of the core layer 140. Various combinations of additional structures may be provided over the flexible display layer 146. For example, interior lenses 154 and 156, as well as exterior lenses 158 and 160 may be utilized. Additionally or alternatively, the front and/or back surfaces of the display unit 114 may be rendered touch sensitive by including one or more touch sensitive layers 151, 152.

Figure 5:
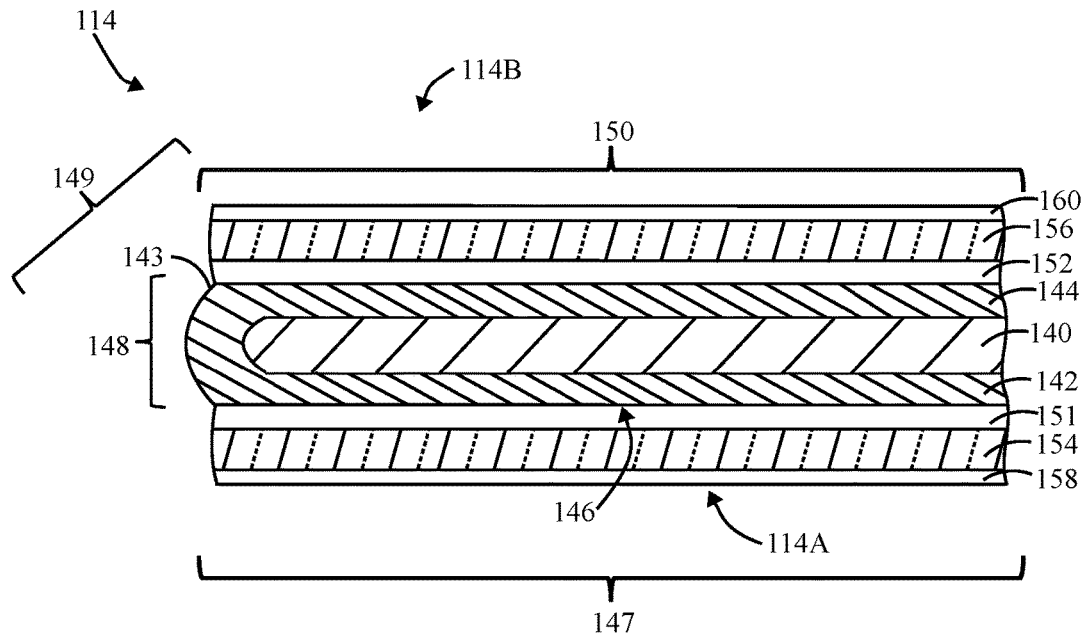
FIG. 5 illustrates a cross-section view of a portion of the display unit in accordance with embodiments herein.

FIG. 5 illustrates a cross-section view of a portion of the display unit 114 taken along line 5-5 in FIG. 1A. In FIG. 5, the front and rear sides 114A and 114B of the display unit 114 are identified. The display unit 114 comprises a core layer 140 that is located centrally within the display unit 114 and formed from a rigid material, such as aluminum, a polymer alloy and the like. The core layer 140 provides structural integrity and durability to the display unit 114. The core layer 140 has opposed first and second sides 142, 144 facing the front and rear sides 114A and 114B of the display unit 114. A flexible display layer 146 is mounted on the core layer 140 and wrapped about the core layer 140.

The flexible display layer 146 is formed as one continuous monolithic structure. As explained herein, the flexible display layer 146 may be functionally segmented into various viewing regions that are managed independently to display desired content. In the example of FIG. 5, the flexible display layer 146 includes primary and secondary viewing regions 147, 149 that are formed integral with one another and as a monolithic structure. The secondary viewing region 149 includes edge and rear viewing regions 148 and 150.

The viewing regions 147-150 are managed independently and may display the same or different content. The primary viewing region 147 is mounted on the first side 142, while the rear viewing region 150 is mounted on the second side 144 such that the primary and rear viewing regions 147, 150 of the display layer 146 are provided along the front and rear surfaces 114A, 114B of the display 114. The edge viewing region 149 is wrapped about an edge 143 of the core layer 140.

The flexible display layer 146 wraps about the edge 143 of the core layer 140 such that the flexible display layer 146 covers at least a portion of the opposed first and second sides 142, 144 of the core layer 140 even though the flexible display layer 146 represents a continuous monolithic structure. In the example of FIG. 5, the flexible display layer 146 wraps around the edge 143 which corresponds to a side of the display unit 114. Additionally or alternatively, the flexible display layer 146 may wrap around both sides of the display unit 114. Optionally, the flexible display layer 146 may wrap around a top edge or a bottom edge of the display unit 114.

FIG. 2 also illustrates the touch sensitive layers located over one or more of the primary, secondary, edge and rear viewing regions 147-150 of the flexible display layer 146. The touch sensitive layers are configured to provide inputs to the processor. As one example, a touch sensitive layer may provide a dual touch layer that affords redundancy to facilitate survival after accidents. In the example of FIG. 5, first and second touch sensitive layers 151 and 152 are provided over the primary and rear viewing regions 147 and 150. The touch sensitive layers 151 and 152 are configured to provide touch inputs to the processor(s) of the device. Optionally, one or both of the touch sensitive layers 151 and 152 may be omitted. For example, the touch sensitive layer 151 may be omitted, while the touch sensitive layer 152 may be retained, in order that the front side 114A of the display unit 114 is not touch sensitive, while the rear side 114B is touch sensitive. The touch sensitive layers 151, 152 may be switched between active and inactive states.

Optionally, the display unit 114 may include one or more lenses provided over select regions thereof. Various combinations of lenses may be utilized. As one example, interior lenses 154 and 156 may be provided over the touch sensitive layers 151 and 152, respectively. The interior lenses 154 and 156 may be made of various types of material, such as polycarbonate plastic (e.g. a shatter resistant material). Exterior lenses 158 and 160 may be provided over the interior lenses 154 and 156, respectively. The exterior lenses 158, 160 may be formed of plastic or another material having a desired protective properties. For example, the exterior lenses may be formed of a hard coat material that is scratch resistant and provides antiglare. It is recognized that additional or fewer lenses may be utilized with additional or alternative properties. Optionally, one or more layers 151-160 may be formed with glass, provided the glass exhibits desired characteristics, such as being thin, light and damage resistant as one example, alkali-aluminosilicate sheet glass may be used as cover glass for portable electronic devices. Examples of types of glass include Gorilla glass by Corning, Dragontrail glass by Asahi Glass Co. and Xensation glass by Schott A G. However, in at least some embodiments, none of the layers 151-160 are formed from glass, in order to prevent shattering or cracking for an extended period of time. Optionally, one or more of the layers 151-160 may be formed of a material exhibiting shock absorbing properties.

The first and second interior lens 154, 156 are secured over the primary and rear viewing regions 147, 150, respectively, and the first and second exterior protective lens 158, 160 are secured over the first and second interior lens 154, 156, respectively, in various manners. Optionally, the display unit 114 may comprise a single first lens located over the primary viewing region 147 and a single second lens located over the rear viewing region 150. Optionally, a single common lens may be provided over the primary viewing region 147 and the rear viewing region 150. For example, the lens may be formed of plastic or other material that may be shaped to follow the shape of the flexible display layer 146 that extends about an edge of the display unit.

The flexible display layer 146 may be formed as a film or other thin layer, and is organized into digital pixels. The pixels are arranged in an array of rows and columns that extends across an entire length, and width of the flexible display layer. The pixels of the flexible display layer 146 are mapped in any desired manner in order to divide presentation of desired types of content in the various regions. As one example, the flexible display layer 146 may be formed from an array of OLEDs.

OLEDs are light-emitting diodes (LED) in which the emissive electroluminescent layer is a film of organic compound that emits light in response to an electric current. There are two main families of OLED, namely small molecule based OLEDs and polymer based OLEDs. Adding mobile ions to an OLED creates a light-emitting electrochemical cell (LEC) which has a slightly different mode of operation. OLED displays can use either passive-matrix (PMOLED) or active-matrix (AMOLED) addressing schemes. Active-matrix OLEDs (AMOLED) utilize a thin-film transistor backplane to switch individuals pixel on or off, but allow for higher resolution and larger display sizes. The OLED display works without a backlight. Thus, the OLED can display deep black levels and can be thinner and lighter than a liquid crystal display (LCD). In low ambient light conditions (such as a dark room), an OLED screen can achieve a higher contrast ratio than an LCD, regardless of whether the LCD uses cold cathode fluorescent lamps or an LED backlight.

A OLED layer may be composed of a layer of organic materials situated between electrodes (e.g., anodes and cathodes), all deposited on a substrate. The organic molecules are electrically conductive as a result of delocalization of pi electrons caused by conjugation over part or all of the molecule. These materials have conductivity levels ranging from insulators to conductors, and are therefore considered organic semiconductors. The highest occupied and lowest unoccupied molecular orbitals (HOMO and LUMO) of organic semiconductors are analogous to the valence and conduction bands of inorganic semiconductors.

Optionally, the flexible display layer 140 may include two or more layers of OLEDs in order to improve device efficiency. Optionally, different materials may be chosen to aid charge injection at electrodes by providing a more gradual electronic profile, or block a charge from reaching the opposite electrode and being wasted. Many modern OLEDs incorporate a simple bilayer structure, that includes a conductive layer and an emissive layer. During operation, a voltage is applied across select OLED pixels such that the anode is positive with respect to the cathode. A current of electrons flows through the device from cathode to anode, as electrons are injected into the LUMO of the organic layer at the cathode and withdrawn from the HOMO at the anode.

It is recognized that the display unit 114 may include additional layers and other structures. Optionally, the display unit 114 may include fewer layers and fewer structures than described herein.

Figure 1B:
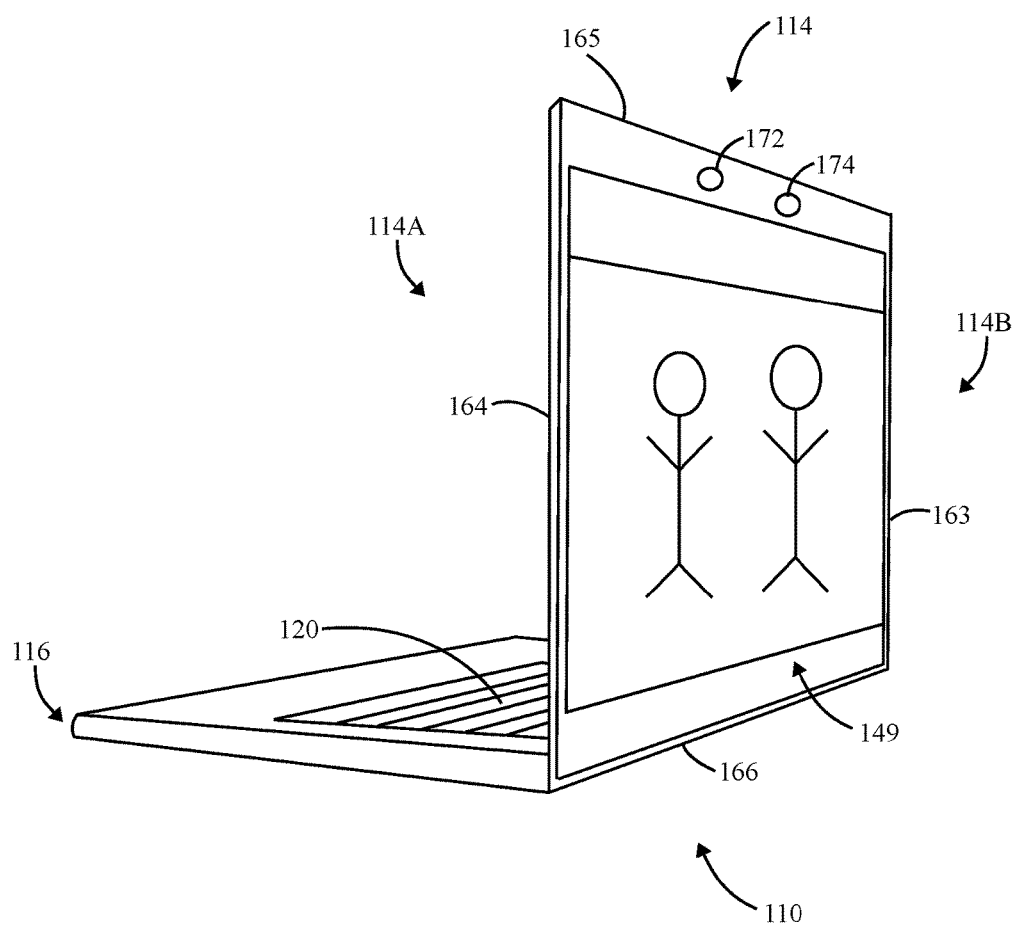
FIG. 1B illustrates a rear perspective view of the electronic device formed in accordance with an embodiment herein.

FIG. 1B illustrates a rear perspective view of the electronic device 110 formed in accordance with an embodiment herein. FIG. 1B better illustrates the rear side 114B of the display unit 114. The rear viewing region 150 extends between (and is located proximate to) opposite lateral or side edges 163 and 164, and extends between top and bottom edges 165 and 166, thereby substantially covering/filling the entire rear side 114B of the display unit 114. The rear side 114B may include one or more microphones 172 and one or more cameras 174. The microphone 172 and camera 174 are directed outward to face in a direction away from the keyboard to provide a field of view and audio field directed away from the rear side 114B.

The main base unit 116 houses a keyboard, processor, memory as well as other components based on the nature and functionality to be provided. The display unit 114 is rotated relative to the main base housing 116 through the hinge (112 in FIG. 1A) to an open position. When in the open position, the front surface 114A of the display unit 114 faces in the direction of the keyboard 120 and is visible to the user of the keyboard 120.

In the example of FIG. 1B, the electronic device 110 is operating in a presentation mode, such that content is displayed on the back surface 114B of the display unit 114. As explained herein, the back surface 114B includes a rear viewing region of a flexible display layer. The device 110 presents various types of content on the rear viewing region. For example, in accordance with a presentation mode, the content presented on the rear viewing region may be the same as the content presented on the first viewing region (corresponding to the front surface 114A. By presenting the same content on the front and rear viewing regions (corresponding to the front and back surfaces 114A and 114B, a user is able to provide a presentation to one or more other individuals who are facing the back surface 114B of the display unit 114.

Non-limiting examples for applications, in which a presentation mode may be utilized, include presenting material in a business environment to colleagues, management, customers, etc. As another example, the presentation mode allows educational and/or instructional material to be presented to students, users and others in educational environments as another example, the presentation mode may be utilized in connection with sales, such as to provide marketing and other material to customers, vendors and the like. The content presented on the back surface 114B may be the same as or different from the content presented on the front surface 114A.

FIG. 3A illustrates a rear perspective view of a device 310 having a display unit 314 and a main body unit 316. The display unit 314 includes a front side 314A and a rear side 314B. In the embodiment of FIG. 3A, the rear side 314B is only partially covered by the flexible display layer. For example, the flexible display layer may include a rear viewing region 350 that only covers a limited segment 341 of the rear side 114B of the display unit 114 with a remaining segment 339 of the rear side 314B uncovered by the flexible display layer. The rear viewing region 350 extends along a side edge 364 but is located remote from the opposite side edge 363. The rear viewing region 350 extends from top edge 365 to bottom edge 366 of the display unit 314. The rear viewing region 350 displays desired content as explained herein. Optionally, an edge viewing region 348 of the flexible display layer may be managed to display content or remained blank. For example, one or both of the edge and rear viewing regions 348, 350 managed to display one or more of alert content, calendar content, message content, advertisement content, personalized content and the like.

Optionally, the edge and/or rear viewing regions 348, 350 may not be operative for the full distance between the top and bottom edges 365, 366. For example, the edge viewing region 348 may be formatted to only actively display content within a segment that extend upward from the bottom edge 366 a predetermined distance short of the top edge 365. Optionally, the rear viewing region 350 may also be formatted to only actively display content within a segment that extends upward from the bottom edge 365 a predetermined distance that is short of the top edge 365. As another example, the edge and rear viewing regions 348, 350 may be defined to extend outward from the top edge 365, but not extend to the bottom edge 366. Is recognized that an OLED layer may cover the entire edge 364, even though only a portion of the pixels within the OLED layer along the edge 364 are actively used to display content.

FIG. 3B illustrates a side perspective view of the device of FIG. 3A with the display unit 314 and main body unit 316 in accordance with embodiments herein. The display unit 314 is rotated to a closed position such that the front side 314A (FIG. 3A) is closed against the main body unit 316. When in the closed position, the electronic device 310 enters a sleep mode, tablet mode, notifications mode and the like. For example, the electronic device 310 may enter the sleep mode, tablet mode, notifications mode, etc., based on an instruction entered by a user or automatically when the display unit 314 is closed. When the electronic device 310 enters the sleep mode, tablet mode, notifications mode, etc., the primary viewing region of the display unit 314 is turned off (or rendered inactive in accordance with a sleep mode). In addition, the secondary viewing region of the display is operated in accordance with the corresponding mode. For example, when in a tablet mode, the rear viewing region 350 may be utilized as a graphical user interface, both for displaying content and receiving user inputs through a touch sensitive layer. As another example, when in a sleep mode or notifications mode, the edge viewing region 348 may display notifications content. Additionally or alternatively, when in the sleep or notifications mode, the rear viewing region 350 may display notifications content. As a non-limiting example, the edge viewing region 348 may display incoming text messages, email notifications, notifications regarding computer or application updates, and the like.

It is recognized that, while the example of FIG. 3A and FIG. 3B illustrates the rear viewing region 350 to cover only a portion of the rear surface 314B, alternatively, the rear viewing region 350 may cover all or a substantial majority of the segment 339 on the rear surface 314B.

Figure 4:
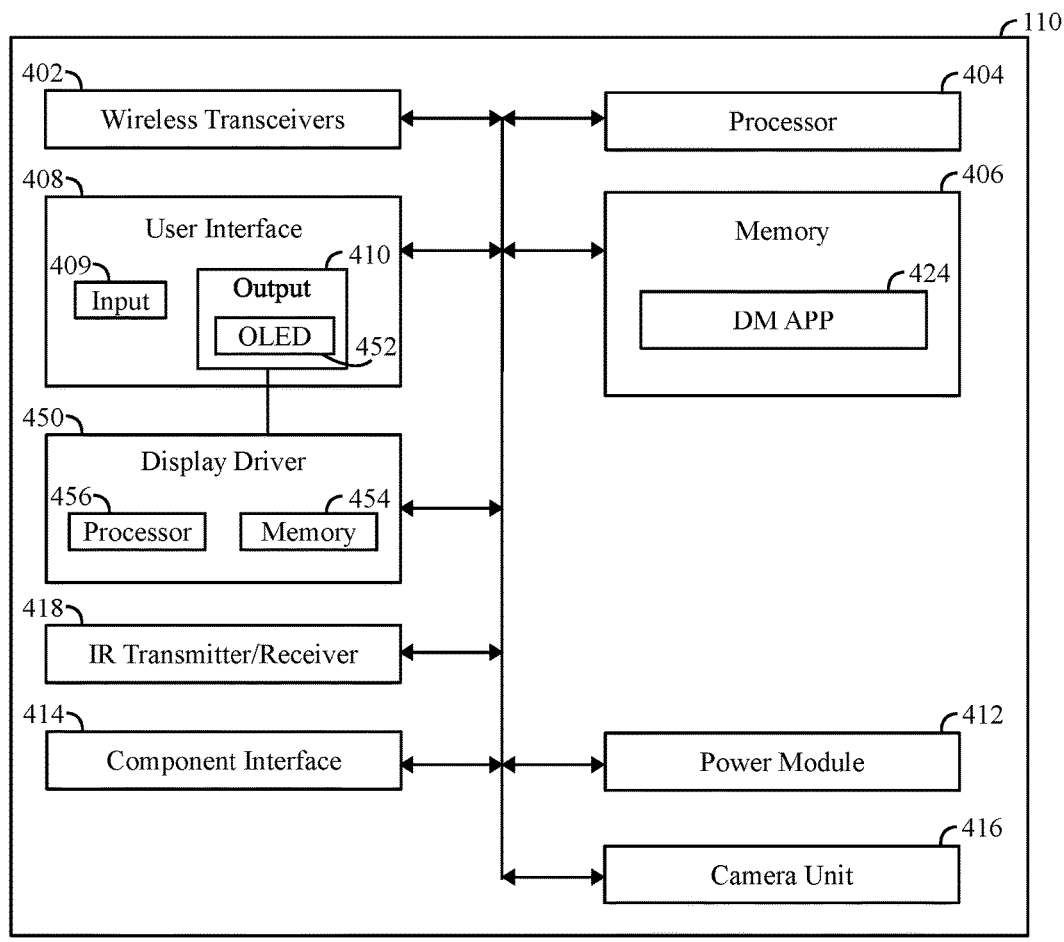
FIG. 4 illustrates a simplified block diagram of internal components of the electronic device configured to manage content display to different regions of a flexible display in accordance with embodiments herein.

FIG. 4 illustrates a simplified block diagram of internal components of the electronic device 110 configured to manage content display to different regions of a flexible display in accordance with embodiments herein. The device 110 includes components such as one or more wireless transceivers 402, one or more processors 404 (e.g., a microprocessor, microcomputer, application-specific integrated circuit, etc.), one or more local storage medium (also referred to as a memory) 406, a user interface 408 which includes one or more input devices 409 and one or more output devices 410, a power module 412, a component interface 414 and a camera unit 416. All of these components can be operatively coupled to one another, and can be in communication with one another, by way of one or more internal communication links, such as an internal bus. The camera unit 416 may capture one or more frames of image data.

The input and output devices 409, 410 may each include a variety of visual, audio, and/or mechanical devices. For example, the input devices 409 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 410 can include a visual output device, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 410 may include a touch sensitive screen, a non-touch sensitive screen, a text-only display, a smart phone display, an audio output (e.g., a speaker or headphone jack), and/or any combination thereof. Optionally, the input devices 409 may include one or more touch sensitive layers provided on the front and/or rear sides of the display 452. The output devices 410 include a flexible display layer, such as an OLED display 452.

The transceiver 402 can utilize a known wireless technology for communication. Exemplary operation of the wireless transceivers 402 in conjunction with other components of the device 110 may take a variety of forms and may include, for example, operation in which, upon reception of wireless signals, the components of device 110 detect communication signals from secondary devices and the transceiver 402 demodulates the communication signals to recover incoming information, such as responses to inquiry requests, voice and/or data, transmitted by the wireless signals. The processor 404 formats outgoing information and conveys the outgoing information to one or more of the wireless transceivers 402 for modulation to communication signals. The wireless transceiver(s) 402 convey the modulated signals to a remote device, such as a cell tower or a remote server (not shown).

The local storage medium 406 can encompass one or more memory devices of any of a variety of forms (e.g., read only memory, random access memory, static random access memory, dynamic random access memory, etc.) and can be used by the processor 404 to store and retrieve data. The data that is stored by the memory 406 can include, but need not be limited to, operating systems, applications, user collected content and informational data. Each operating system includes executable code that controls basic functions of the device, such as interaction among the various components, communication with external devices via the wireless transceivers 402 and/or the component interface 414, and storage and retrieval of applications and data to and from the memory 406. Each application includes executable code that utilizes an operating system to provide more specific functionality for the communication devices, such as file system service and handling of protected and unprotected data stored in the local storage medium 406.

A display management (DM) application 424 is stored in the memory 406. The DM application 424 includes program instructions accessible by the one or more processors 404 to direct a processor 404 to implement the methods, processes and operations described herein including, but not limited to the methods, processes and operations illustrated in the Figures and described in connection with the Figures. The DM application 424 manages operation of the processor 404, display driver 450 and/or a video card in connection with displaying desired content on the primary and secondary (e.g., edge and/or rear) viewing regions of the flexible display layer.

In accordance with at least one embodiment, a touch sensitive layer is located over the secondary viewing region of the display layer on the back surface of the display unit. The DM application 424 directs the processor to switch to a tablet mode when the display unit is in the closed position and utilizes the back surface of the display unit as a graphical user interface. In accordance with at least one embodiment, the processor utilizes the secondary viewing region of the display layer to display one or more of alert content, calendar content, message content, advertisement content, or personalized content.

Other applications stored in the memory 406 include various application program interfaces (APIs), some of which provide links to/from the cloud hosting service. The power module 412 preferably includes a power supply, such as a battery, for providing power to the other components while enabling the device 110 to be portable, as well as circuitry providing for the battery to be recharged. The component interface 414 provides a direct connection to other devices, auxiliary components, or accessories for additional or enhanced functionality, and in particular, can include a USB port for linking to a user device with a USB cable.

Optionally, the device 110 may include an infrared (IR) transmitter/receiver 418 that may be utilized in connection with controlling one or more secondary devices through transmission and reception of IR signals.

A display driver 450 is coupled to the processor 404 and configured to manage display of content on a display 452. The display driver 450 is connect to the primary and secondary viewing regions of the OLED display 452. The display driver 450 writes the desired content to the primary and secondary viewing regions under direction of the main processor 404. Optionally, the display driver 450 includes display memory 454 and one or more display control processors 456. The display memory 454 includes multiple sections, to which the display control processors 456 and/or processor 404 write content to be displayed. The sections of the display memory 454 are mapped to corresponding regions of the flexible display layer. An example of one mapping configuration is discussed herein in connection with FIG. 8. The display driver 450 provides a common display interface for all of the viewing regions within the flexible display layer within the display 452. For example, the display driver 450 manages display of content in the primary and secondary viewing regions.

Optionally, the display driver 450 may omit a separate processor and memory, and alternatively or additionally, utilize sections of the memory 406 as display memory and the processor 404 to manage writing content to a display memory section within the memory 406.

Next, exemplary embodiments are described in connection with implementing the operations herein. The operations of the FIGS. may be implemented by one or more processors within the devices 110.

Figure 6:
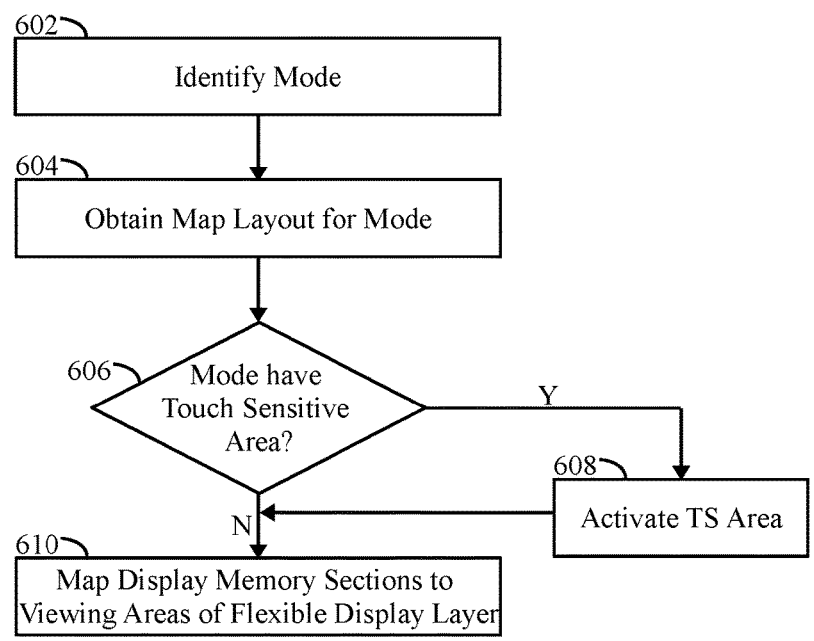
FIG. 6 illustrates a process for configuring a display unit based on an embodiment herein.

FIG. 6 illustrates a process for configuring a display unit based on an embodiment herein. At 602, one or more processors of the device 110 identify the mode of operation. Non-limiting examples of modes may include a standard mode, a presentation mode, a tablet mode, a notifications mode and a user query mode. As one example, the device 110 may enter a predetermined initial mode when the device 110 is initially powered up and a user logs in. The device 110 may remain in the initial mode until the device "goes to sleep", powers down, and the like. Optionally, the device 110 may switch modes based on a relative position of the keyboard and the display unit. For example, when the display unit is closed onto the keyboard, the device may automatically switch to a tablet mode. Optionally, the user may provide an instruction to change the mode, such as to switch to a presentation mode, a tablet mode, and the like. Optionally, the device 110 may remain in a mode throughout operation without change.

At 604, the one or more processor of the device 110 obtains a map layout. The map layout may be based on the mode and/or other criteria. The map layouts may be defined at a time that the device 110 is manufactured and/or may be defined/modified with software updates. The map layouts may be uploaded with a display driver. One or more modes of operation may have common or different map layouts. For example, the standard mode may correspond to a standard map layout in which the primary viewing area is the only active viewing area, while the rear and edge viewing areas are deactivated. The presentation mode may correspond to a presentation map layout in which the secondary viewing area displays the same content as the primary viewing area. The presentation map layout may deactivate the edge viewing area. The tablet mode and/or user query mode may correspond to a tablet or query map layout in which the secondary viewing area is the only active viewing area, while the primary and edge viewing areas are deactivated. The notifications mode and/or user query mode may correspond to a notifications and/or query map layout in which the edge viewing area is active, while the primary and rear viewing areas are deactivated.

At 606, the one or more processors of the device 110 determine whether the identified mode includes one or more touch sensitive areas. For example, the tablet mode and/or the presentation mode may include one or more touch sensitive areas (e.g., the primary and/or rear viewing area). When the present mode includes a touch sensitive area, flow moves to 608. Otherwise, flow moves to 610. At 608, one or more touch sensitive areas are activated. For example, when in the presentation or user query modes, a touch sensitive layer within the secondary viewing area may be activated to be touch sensitive. Additionally or alternatively, the standard mode may include activating a touch sensitive layer within the rear viewing area. Additionally or alternatively, the standard mode (or any other mode) may include activating a touch sensitive layer within the primary viewing area.

At 610, the one or more processors maps sections of the display memory to the corresponding viewing areas. For example, different sections of the display memory are mapped to the primary, secondary and edge viewing regions of the flexible display layer.

Figure 7:
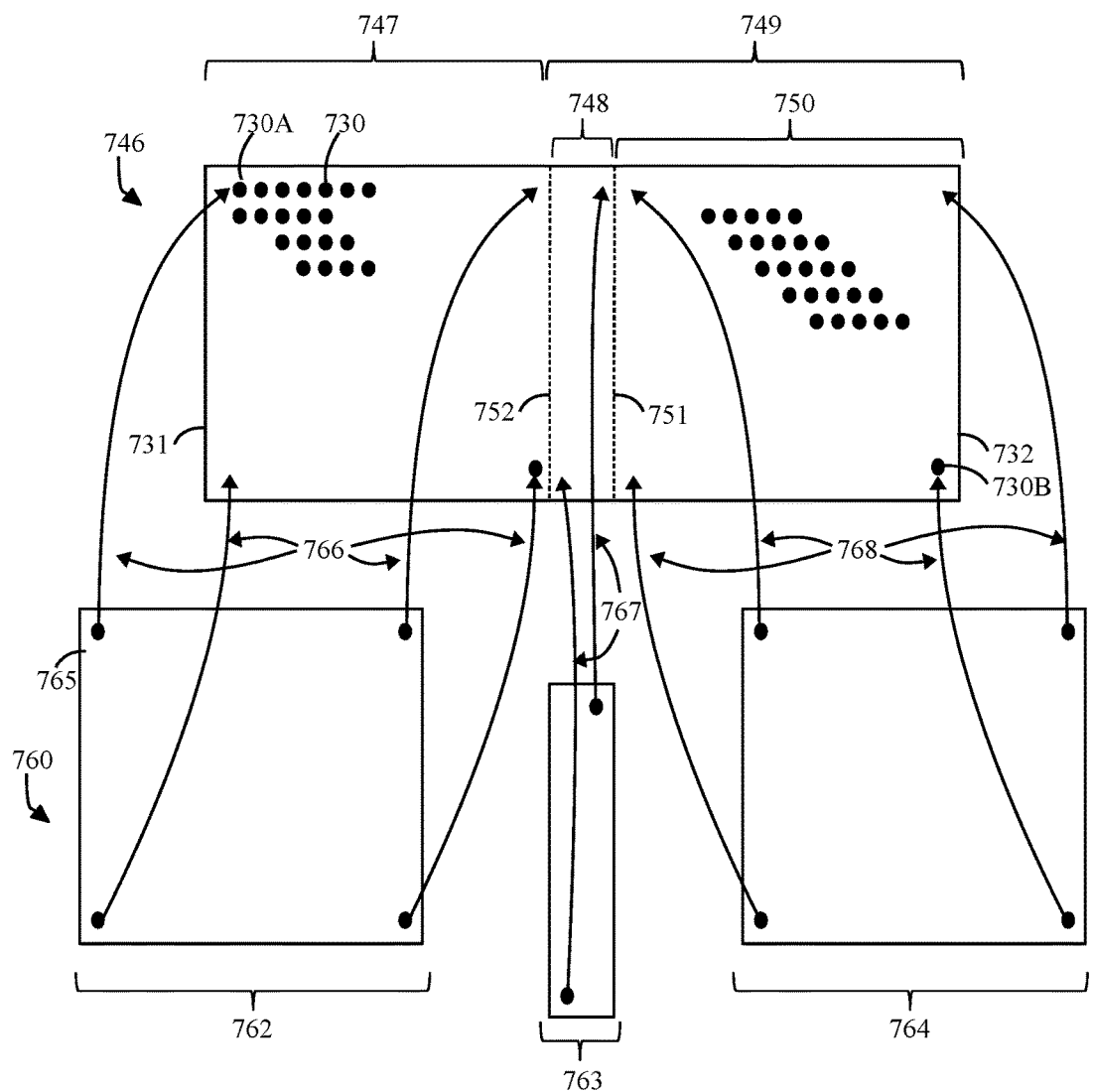
FIG. 7 illustrates a graphical representation of a mapping relation between display memory sections and viewing areas utilized in accordance with an embodiment herein.

FIG. 7 illustrates a graphical representation of a mapping relation between display memory sections and viewing areas utilized in accordance with an embodiment herein. Within FIG. 7, a flexible display layer 746 is illustrated as an elongated rectangular array of digital pixels (a portion of which are noted as pixels 730). The flexible display layer 746 includes a continuous homogeneous two dimensional (2D) rectilinear array of digital pixels 730 is arranged in rows and columns that traverse the primary and secondary viewing regions between opposite edges 731 and 732 of the flexible display layer 746. The digital pixels 730 are individually addressed by the display driver on a video card. For example, the pixel 730A may correspond to an initial coordinate (0, 0) within the array, while pixel 730B corresponds to a final coordinate (e.g., (2048×768), (4288×2848)).

The flexible display layer 746 is functionally divided into a primary viewing region 747 and a secondary viewing region 749. The secondary viewing region 749 is further divided into an edge viewing region 748 and a rear viewing region 750. Dashed lines (referred to as functional division lines 751, 752) cross the flexible display layer 746 to illustrate conceptual division between the functionality of the regions 747-750. It is recognized that the size of the regions 747-750 may vary, as well as the overall shape and form factor of the flexible display layer 746. While functionality may differ between the regions 747-750, the array of pixels within the flexible display layer 746 extend across the functional division lines 751, 752.

As explained herein, when the flexible display layer 746 is installed within a display unit, the primary viewing region 747 is mounted on one side of a core layer, with the primary viewing region 747 oriented to face outward from the front side of the display unit. When utilized with a personal computer, the front viewing region 747 faces toward the keyboard. When utilized with a smart phone, the front viewing region 747 forms part of the primary user interface of the smart phone.

When installed, the secondary viewing region 749 wraps at least around and edge of the display unit. The secondary viewing region 749 may be limited to an edge viewing region 748, without an additional rear viewing region 750. Optionally, the secondary viewing region 749 may extend beyond the edge of the display with the rear viewing region 750 mounted on a rear side of the display unit and facing outward from the rear side. When utilized with a personal computer, the rear viewing region 750 faces away from the keyboard. When utilized with a smart phone, the rear viewing region 750 faces away from the primary user interface.

FIG. 7 also illustrates a display memory 760 that may represent one continuous section of memory or multiple separate sections of memory. The display memory 760 is divided into first, edge and second memory sections 762-764. During operation, the device rights different types of content to the corresponding first, edge and second memory sections 762-764 based upon various criteria, such as the nature of the content, the mode of operation and the like. For example, during a standard mode of operation, all visual content may be written to the first memory section 762, without any visual content written to the edge or second memory sections 763, 764. During a presentation mode of operation, all visual content may be written to both of the first and second memory sections 762, 764, without any visual content being written to the edge memory section 763. During a notifications mode of operation, desired types of content (e.g. notifications) may be written to the edge memory section 763, without the notification content being written to the first or second memory sections 762, 764.

FIG. 7 also illustrates an example of a manner by which the first, edge and second memory sections 762-764 may be mapped to regions of the flexible display layer 746. As one example, the first memory section 762 may be defined to have an array of addresses that are arranged in rows and columns corresponding to the array of pixels 730 within the primary viewing region 747. Continuing with this example, a first memory address 765 in the first memory section 762 may be mapped to a first pixel 730A in the primary viewing section 747. Rows and columns of addresses within the first memory section 762 are mapped as noted by the arrows 766 to corresponding pixels 730 in the primary viewing section 747.

The edge memory section 763 is also defined to have an array of addresses arranged in rows and columns corresponding to the array of pixels within the edge viewing region 748. The memory mapping between the edge memory section 763 and the edge viewing region 748 is noted by arrows 767. The second memory section 764 is defined to have an array of addresses arranged in rows and columns corresponding to the array of pixels within the rear viewing region 750 as noted by arrows 768. It is recognized that the mapping configuration illustrated in FIG. 7 is merely one example and that numerous alternatives exist.

In the example of FIG. 7, the first, edge and second memory sections 762-764 are illustrated to mapped to continuous, yet non-overlapping, pixel arrays within the flexible display layer 746. Optionally, one or more of the first, edge and second memory sections 762-764 may be mapped to pixel arrays that are spaced apart from one another by more than one column of pixels. For example, the first and edge memory sections 762, 763 may be mapped to arrays of pixels that are spaced apart by a predetermined distance (e.g., corresponding to one or more columns of pixels).

Figure 8:
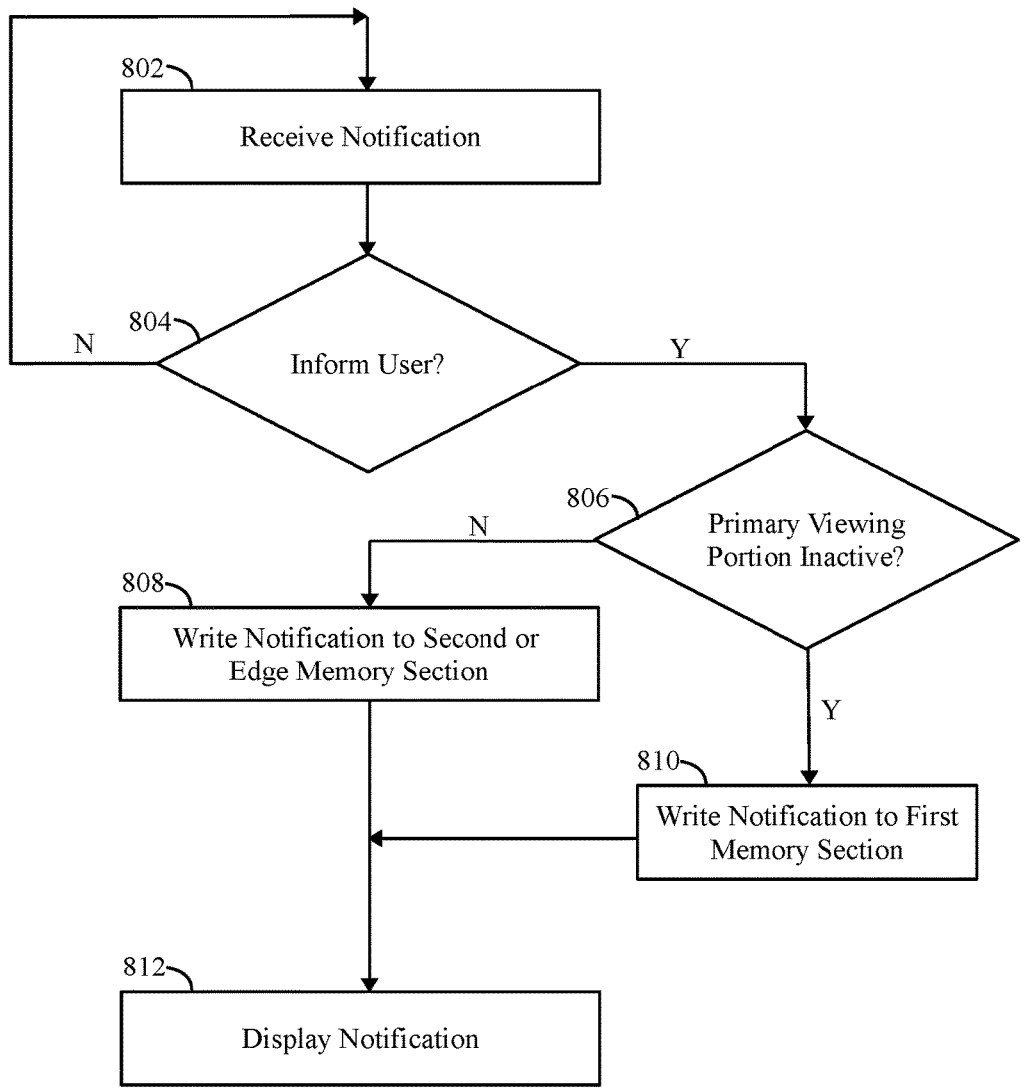
FIG. 8 illustrates a process for managing presentation of the notification in accordance with an embodiment herein.

FIG. 8 illustrates a process for managing presentation of the notification in accordance with an embodiment herein. At 802, one or more processors of the device determine that a notification has been received by the device. For example, the notification may represent an incoming email, text message or other communication from a third party. As another option, the notification may represent a scheduled event, such as a calendar event, a system related activity and the like.

At 804, the one or more processors determines whether to present the notification to the user. For example, the device may be in certain modes, wherein the user does not want to be informed of notifications. As another example, certain types of notifications may be filtered to avoid presentation to the user. At 804, when the processor determines that no notification is to be presented to the user, flow returns to 802 to wait for the next operation. Otherwise, when the processor determines that the notification should be presented to the user, flow advances to 806.

At 806, the one or more processors determines whether the primary viewing region of the flexible display layer is in an active or inactive state. The primary viewing area may be inactive based on a user input or based on automatic criteria. For example, on a personal computer, when the display unit is closed against the keyboard, the primary viewing region is deactivated. As another example, the primary viewing region may be deactivated when the device is not used for an extended period of time, after which the device enters a sleep mode or a partial shutdown mode. When the primary viewing region is active, flow advances to 810. When the primary viewing region is inactive, flow advances to 808.

In the foregoing example, the decision at 806 is based on whether the primary viewing region is active or inactive. Optionally, alternative or additional criteria may be used at 806 to determine whether to branch to 808 or 810. For example, the decision at 806 may be based wholly or in part on whether the primary viewing region is designated to receive notifications. For example, at 806, the processor may determine that the primary viewing region is active, but not designated for display of notifications. For example, the mode of operation may be set such that all notifications are routed to a secondary or edge viewing region, while the primary viewing region never receives notifications. As another option, certain types of notifications may be directly routed to the secondary or edge viewing regions and not displayed on the primary viewing region.

At 808, the one or more processors writes the notification to the second or edge memory section. Alternatively, at 810, the one or more processors writes the notification to the first memory section. At 812, the notification is displayed within the corresponding region of the flexible display layer, namely the primary viewing region, edge viewing region or rear viewing region based on which memory section receives the notification.

Before concluding, it is to be understood that although e.g. a software application for undertaking embodiments herein may be vended with a device such as the system 110, embodiments herein apply in instances where such an application is e.g. downloaded from a server to a device over a network such as the Internet. Furthermore, embodiments herein apply in instances where e.g. such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device, comprising:
  a display unit having front and back surfaces, the display unit comprising:
    a flexible display layer having primary and secondary viewing regions formed as a monolithic structure, the primary viewing region mounted on the front surface of the display unit, the secondary viewing region folded about at least an edge of the display unit;
    a memory to store program instructions;
    a processor to execute the program instructions to direct the primary and secondary viewing regions to display first and second content, respectively; and
    a core layer having first and second sides, wherein the secondary viewing region further comprises an edge viewing region and a rear viewing region, the edge viewing region wrapping about an edge of the core layer, the rear viewing region mounted to and extending at least partially along the second side of the core layer.

2. The device of claim 1, wherein the processor to utilize the secondary viewing region of the display layer to display one or more of alert content, calendar content, message content, advertisement content, or personalized content, while the primary viewing region is either inactive or to display other content.

3. The device of claim 1, wherein the secondary viewing region of the display layer covers a limited segment of the back surface of the display unit with a remaining segment of the back surface uncovered by the display layer.

4. The device of claim 1, further comprising:
  first and second interior lens located over the primary and secondary viewing regions, respectively, of the flexible display layer;
  first and second exterior protective lens located over the first and second interior lens, respectively; and
  a touch sensitive layer located over at least one of the first or secondary viewing regions of the flexible display layer, the touch sensitive layer to provide inputs to the processor.

5. The device of claim 1, wherein the processor to execute the program instructions to direct the primary and secondary viewing regions to display different first and second content, respectively, at a same time.

6. The device of claim 1, further comprising a display driver connected to the array of digital pixels, the display driver writing the first and second content to the primary and secondary viewing regions simultaneously and independently under direction of the processor.

7. The device of claim 1, wherein the second content represents notification related content, the display to display the notification related content in the secondary viewing region while simultaneously displaying the first content on the primary viewing region.

8. An electronic device, comprising:
  a display unit having front and back surfaces, the display unit comprising:
    a flexible display layer having primary and secondary viewing regions formed as a monolithic structure, the primary viewing region mounted on the front surface of the display unit, the secondary viewing region folded about at least an edge of the display unit;
    a memory to store program instructions; and
    a processor to execute the program instructions to direct the primary and secondary viewing regions to display first and second content, respectively, wherein the flexible display layer is elongated and includes primary and secondary arrays of digital pixels that traverse the primary and secondary viewing regions, respectively, the primary array of digital pixels arranged adjacent to the secondary arrays of digital pixels and located between opposite edges of the flexible display layer.

9. The device of claim 8, further comprising a display driver connected to the array of digital pixels, the display driver writing the first and second content to the primary and secondary viewing regions simultaneously and independently under direction of the processor.

10. The device of claim 8, further comprising a main body unit including a keyboard, the display unit mounted to the main body unit through a hinge to permit the display unit and main body unit to rotate between open and closed positions.

11. An electronic device, comprising:
a display unit having front and back surfaces, the display unit comprising:
a flexible display layer having primary and secondary viewing regions formed as a monolithic structure, the primary viewing region mounted on the front surface of the display unit, the secondary viewing region folded about at least an edge of the display unit;
a memory to store program instructions;
a processor to execute the program instructions to direct the primary and secondary viewing regions to display first and second content, respectively;
a main body unit including a keyboard, the display unit mounted to the main body unit through a hinge to permit the display unit and main body unit to rotate between open and closed positions, wherein the secondary viewing region comprises a secondary array of pixels that continues to display the second content while the front surface of the display unit is in the closed position and located proximate to the keyboard.

12. The device of claim 11, further comprising a touch sensitive layer located over the secondary viewing region of the display layer on the back surface of the display unit, wherein the processor switches to a tablet mode when the display unit is in the closed position and utilizes the back surface of the display unit as a graphical user interface.

13. A method, comprising:
providing an electronic device comprising a display unit comprises a flexible display layer having primary and secondary viewing regions formed as a monolithic structure, the primary viewing region located on a front side of a display unit, the secondary viewing region folded about at least an edge of the display unit; and
providing one or more processors, to execute specific executable program instructions, to display first and second content on the primary and secondary viewing regions, respectively, wherein the second content represents notification related content, the displaying comprising displaying the notification related content in the secondary viewing region while simultaneously displaying the first content on the primary viewing region.

14. The method of claim 13, further comprising displaying the second content on a pixel array of the secondary viewing region while a pixel array of the primary viewing region is inactive.

15. The method of claim 13, wherein electronic device includes a main body unit attached to the display unit through a hinge, and wherein the second content is displayed while the display unit is rotated to a closed position against the main body unit.

16. The method of claim 13, further comprising identifying a mode of operation for the electronic device, wherein the mapping includes mapping sections of the display memory to the primary and secondary viewing regions based on the mode of operation.

17. A method, comprising:
providing an electronic device comprising a display unit comprises a flexible display layer having primary and secondary viewing regions formed as a monolithic structure, the primary viewing region located on a front side of a display unit, the secondary viewing region folded about at least an edge of the display unit;
providing one or more processors, to execute specific executable program instructions, to display first and second content on the primary and secondary viewing regions, respectively;
mapping sections of a display memory to the primary and secondary viewing regions, and writing the different first and second content, at a same time, to corresponding sections of the display memory in connection with displaying the first and second content on the primary and secondary viewing regions at the same time.

18. A computer program product comprising a non-signal computer readable storage medium comprising computer executable code to:
map a first section of a display memory to a primary viewing region of a flexible display layer having a primary viewing region;
map a second section of the display memory to a secondary viewing region folded about at least an edge of the display unit; and
write first and second content to corresponding first and second sections of the display memory in connection with displaying the first and second content on the primary and secondary viewing regions at the same time.

19. The computer program product of claim 18, wherein the executable code further comprises receiving a notification, and writing notification related content to the corresponding section of the display memory mapped to the secondary viewing region.

20. The computer program product of claim 18, wherein the executable code further comprises activating a touch sensitive layer provided within the display unit overlapping the second viewing region when in a first mode of operation and deactivating the touch sensitive layer when in a second mode of operation.

* * * * *